G. T. SMITH.
PROCESS OF PURIFYING FLOUR DURING THE MANUFACTURE THEREOF.
APPLICATION FILED MAY 23, 1912.
1,154,547.
Patented Sept. 21, 1915.
2 SHEETS—SHEET 1.
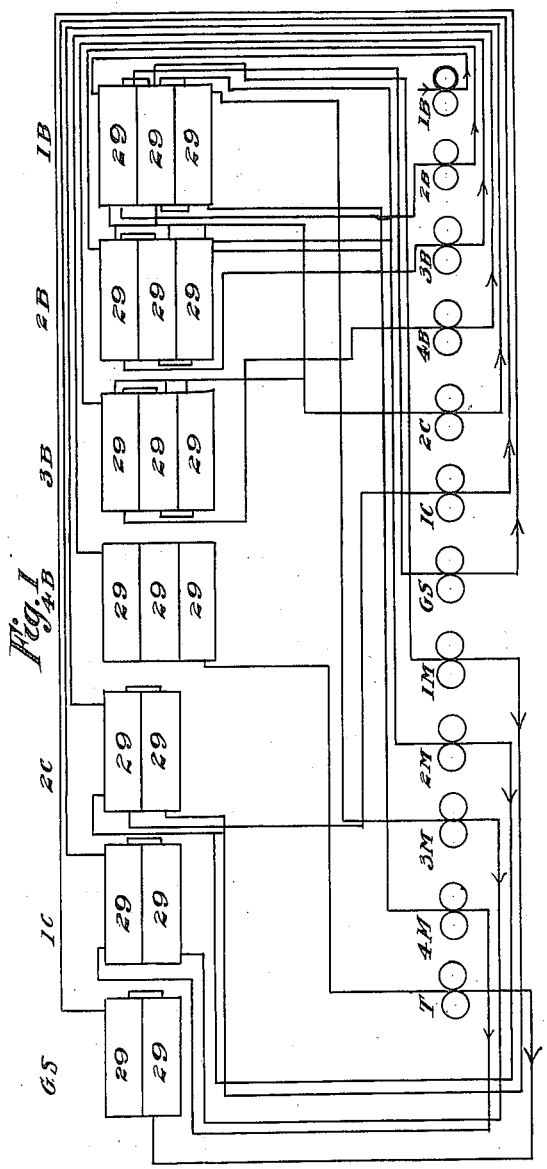
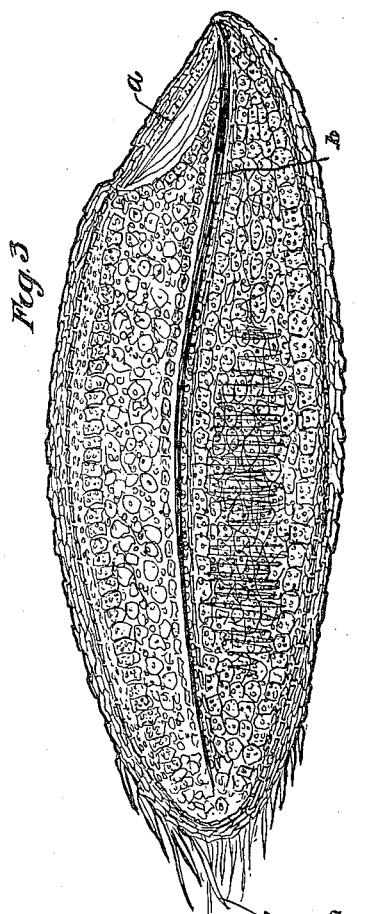
Witnesses
L. T. Knight
Inventor
Geo. T. Smith.
By A. D. Jackson
Attorney

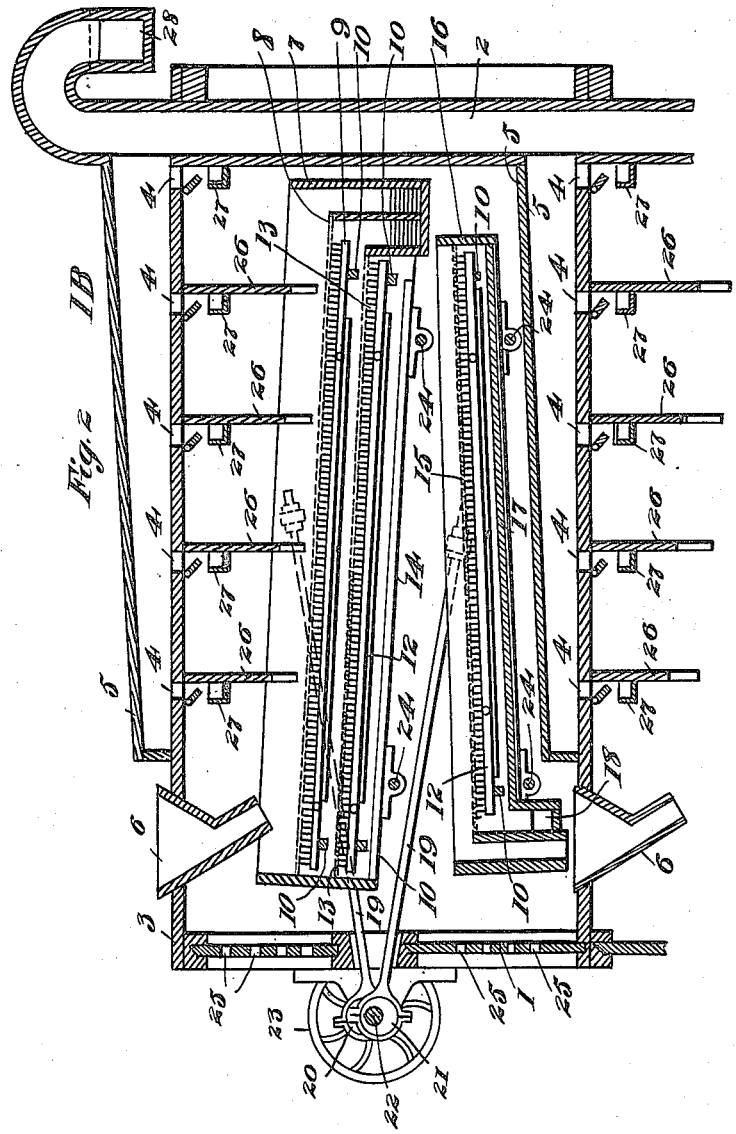

UNITED STATES PATENT OFFICE.

GEORGE THOMAS SMITH, OF FORT WORTH, TEXAS.

PROCESS OF PURIFYING FLOUR DURING THE MANUFACTURE THEREOF.

1,154,547.   Specification of Letters Patent.   Patented Sept. 21, 1915.

Application filed May 23, 1912. Serial No. 699,219.

*To all whom it may concern:*

Be it known that I, GEORGE T. SMITH, citizen of the United States, residing at Fort Worth, in the county of Tarrant and State of Texas, have invented certain new and useful Improvements in Processes of Purifying Flour During the Manufacture Thereof, of which the following is a specification.

My invention relates to a process of purifying flour during the manufacture thereof, and the objects are to simplify the process of manufacture of flour, to avoid excessive milling, to clear the flour of poisonous and other matter, and to increase the output of first grade flour. The middlings purifiers and the sieves in common use, as separate machines, are dispensed with and the purifying is accomplished or carried out at every step in the manufacture of the flour. In the old process, the efforts were to avoid making much fiber, that is, to avoid grinding much of the fibrous material, because it could not be separated from the flour, and it would pass through with the flour. For this reason much of the wheat was wasted in the bran.

One of the objects of this invention is to grind the wheat or break the wheat more and thus separate more of the wheat from the bran and thus save much more of the wheat than in old processes and to provide means for separating the finely ground fiber from the flour.

One of the most important objects of this invention is to remove a black substance, or as it is sometimes called "crease dirt" or black powder. By reference to Figure 3 of the drawings, the structure of a grain of wheat may be understood. During the growth of the wheat there is a duct substantially through the center of the berry longitudinally through which the food sucked from the earth and air is fed to the berry and the food which is not digested remains in this duct after maturity of the berry and becomes a black substance and when the wheat is ground becomes a fine powder and is thoroughly mixed in the flour. The black substance is known to be poisonous and should be removed from the flour and the object of this process is to remove the black substance at the same time the finely ground fiber is removed. This black substance is what causes the slightly blue cast in flour and the process improves the grade of the flour.

Another object above noted is to avoid excessive milling. The flour that is light enough to float in the air is dead and this is caused by over-milling. The cellular formation has been destroyed and there are no gas cells in which yeast may enter,—hence such flour will not be affected by yeast in cooking. This destruction is brought about by passing through a maze of machinery, such as mills, sieves, purifiers, elevators, and chutes.

The object of this invention is to dispense with much of the machinery in the manufacture of flour.

There is an advantage in removing the fibrous material from the head of the machine before it passes down in the rolls and that is, it requires less power to drive the rolls. The fibrous material is removed in the first grading machine it reaches after being ground. The same kind of process removes the black substance. As the stock passes through a mill, some of the wheat is made into flour and some of the black substance is released; consequently when the flour reaches the first grading machine the released black substance is removed and the flour and wheat stock pass on for further action. In this manner the released black substance does not pass on mixed with the flour. At every passage of the stock through a set of rollers, more black substance is released and is taken out by the next grading machine before it passes to another set of rollers. The same thing is done with other impurities, such as fibrous material.

It has long been known that there is a black substance about some wheat that should be removed. There have been granted several patents—some in the United States of America and some in Great Britain intended to clean the wheat and remove the black substance. The patentees have thought that this black substance can be removed by a preliminary cracking or splitting of the wheat, and then using a cleaning process. My invention includes such processes as have heretofore been used. But such processes are not adequate to remove this black substance which is located within the wheat berry. The wheat must be thoroughly and repeatedly ground so that the black substance is reduced to a fine black powder, which can be removed by the process herein described, the process being repeated after each grinding of the stock.

Other objects and advantages will be fully explained in the following description and the invention will be more particularly pointed out in the claims.

Reference is had to the accompanying drawings which form a part of this application.

Fig. 1 is a diagrammatic view of a series of grading machines and mills for manufacturing flour. Fig. 2 is a longitudinal section of one unit of one of the grading machines and a broken section of the next unit below. Fig. 3 is a longitudinal section of a grain of wheat highly magnified.

Similar characters of reference are used to indicate the same parts throughout the several views.

The manufacture of flour herein described includes the cleaning of the wheat and the grinding of the wheat and there are no changes in the machines for carrying out these processes. The series of mills are indicated by two circles for each mill, as the first breaking of wheat 1B; second breaking, 2B; third breaking, 3B; fourth breaking, 4B; second chops 2C; first chops, 1C; germ sizer (G. S.); first middlings 1M; second middlings, 2M; third middlings; fourth middlings, 4M; and tailings, T. The stock passes to grading machines indicated by the same characters. The mills and machines are shown only in conventional form in Fig. 1. The first four grading machines are shown with three units and the last three machines with two units each. The lines extending from the mills to the grading machines indicate the passing of stock from a mill to the proper grading machine.

In Fig. 3, $a$ indicates the germ of the grain of wheat and $b$ indicates the poisonous black substance and $c$ indicates the beard. $c$ and $b$ are the elements to be removed in black substance and $c$ indicates the beard. is ground into a fine powder which is lighter than the flour and the black substance is released in the grinding process which is a black powder also lighter than the flour.

One of the units shown in Fig. 1 is shown in detail in Fig. 2. The machine is provided with a casing having a slotted front wall 1 at one end and a suction air flue 2 which closes the other end. The top 3 is slotted at 4 to provide valves which open into the stationary air trunk 5. A hopper 6 is mounted on the machine and provided with a spout projecting in the casing. A screen holder 7 is swingingly mounted in the casing. The holder 7 supports a screen of cloth 8 which is stretched and attached to the holder. A brush or set of brushes 9 is mounted under the screen 8 to be reciprocated with the bristles rubbing against the bottom of the screen. The brushes slide on bars 10. A second screen 13 is stretched and attached to the holder 7 and a set of brushes 12 is mounted on bars 10 to be reciprocated under the screen 13. The material which passes through the screen 13 falls on a screen 15 which is stretched and attached to a holder 16 which is swingingly mounted. The material which passes through screen 15 is flour and falls on the chute 17 and passes out through a spout 18 to be bolted. The holders 7 and 16 are vibrated or shaken by rods 19 which are connected to the holders and to eccentrics 20 and 21. The eccentrics are mounted on and driven by a shaft 22 which may be driven by the pulley wheel 23. A set of brushes 12 is arranged to brush the bottom of screen 15. It is preferable to vibrate the screens longitudinally to shift the ground stock forward, but the brushes are shifted laterally. The holders 7 and 16 are pivotally mounted on swinging shafts 24. Provision is made for regulating the passage of air through the machine. Air for cleaning the ground wheat and flour comes in through slots 25 in the casing 1. The air passes through all the screens and lifts the impurities out of the stock and carries the same through an air or suction trunk 5 which is connected or opens into a suction flue 2 which is to be connected with a suction fan. Partitions 26 extend across the upper interior part of the inclosure and as close down to the screen 8 as may be practical for the purpose of even distribution of the air. The valves 4 may be more or less closed to regulate the flow of air which is carrying impurities to the trunk 5. Deposit chambers 27 are transversely arranged in the casing and attached to the partitions 26. These deposit chambers serve as gages for determining whether the proper amount of air is passing through the valves. A person can tell by the amount of deposit in these chambers whether the proper amount of air is passing through the valves. The impurities are taken out of the stock at every movement of the stock and carried through a suction chute 28 and collected in a suitable receptacle. By constructing several machines together with one superposed upon the other, the bottom of one machine may constitute the top of the next machine below, as shown in Fig. 2. In this manner, the air trunk 5 of the machine below may be inclosed in the machine above. This will economize space. The above description is applicable to any one of the units marked 29. These machines are grading machines and from these machines the stock is sent to different mills according to the grade of the stock. Some flour is taken from each unit and flour is taken from the last chute or lowest element, as the chute 17, of the machine. From the mills the stock is taken to the proper grading machine. Each time the stock passes through a mill for regrinding, more black substance is loosened and in the grading machines the black substance is removed from the flour or stock at every movement of the flour or stock. At every movement of the particles of flour or broken wheat, more black substance is released and will be lifted out by the air suction, as the finely powdered black substance is lighter than the flour. This constant moving of the stock and regrinding of the wheat tends to dry the broken wheat and flour and the black substance and the drier the black substance is, the easier it is removed by the air draft. The beard and other fiber from the wheat are ground into a fine powder which is lighter than the wheat and this fine powder is removed with the black substance. This is one advantage in this new process. The wheat can be ground more without any danger of the ground fiber being left in the flour. The process of removing the black substance and the ground fiber is continuous in every unit of every grading machine. The flour which is taken from the lowest member of each unit is ready for use or bolting, having been purified as above explained. This process of purifying will also bleach the flour because it is treated with air and this manner of bleaching may take the place of the air bleaching process which is practised. The ground wheat and flour are continually agitated throughout the grading machines by the shifting of the holders or screen holders. Every particle of material is treated with an air draft before it passes out of a grading machine. The grading and cleaning or purifying go on simultaneously. The wheat which is not sufficiently ground to make flour is taken from the proper point in the grading machine to the proper mill for re-grinding. By the time the wheat is completely reduced to flour all the black substance in the wheat will be reduced to a fine powder which is removed as above described. The black substance is a valuable article of commerce and is collected during the process into suitable receptacles which receive the black substance as it is discharged through suction fans.

What I claim is,—

1. The herein-described process of purifying flour containing impurities lighter in weight than flour, which consists in moving said flour and impurities in a relatively thin layer and simultaneously forcing a slight draft of air uniformly throughout said moving layer for lifting and carrying away said lighter impurities from said flour.

2. The herein-described process of purifying flour containing impurities lighter in weight than flour during the manufacture thereof, consisting in the repeated partial grinding of the wheat until the wheat is reduced to flour, moving and agitating the broken wheat and the flour and separating the flour from the broken wheat after each grinding, forcing a slight draft of air uniformly throughout the mass of moving broken wheat and flour and throughout the completely reduced and separated flour between each grinding while the wheat and flour are being agitated and separated for lifting and carrying away said lighter impurities and leaving the flour.

3. The herein-described process of purifying flour which consists in the gradual reduction of the wheat into flour and the impurities into fine powder lighter in weight than flour by grinding until the wheat is reduced to flour, moving the mass of partly ground wheat and flour and impurities and separating the flour from the partially ground wheat after each grinding, and simultaneously forcing a slight draft of air uniformly throughout the mass of moving material, said draft being constant and of sufficient strength only to lift and carry away said lighter impurities without moving the flour.

4. The herein-described process for removing impurities which are lighter in weight than flour from flour and partially ground wheat which consists in repeated partial grindings of wheat until the wheat is reduced to flour and the impurities to a fine powder, moving and grading the partially ground wheat in masses of relatively thin layers, separating the flour from the partially ground wheat and simultaneously forcing a slight draft of air throughout each layer of wheat and flour while being moved and graded for lifting and carrying away said light and finely powdered impurities out of the flour.

5. The herein-described process of removing impurities from flour and ground wheat which consists in repeated partial grindings of the wheat until all of the wheat is entirely reduced to flour and the impurities to a fine powder which is lighter in weight than flour, moving the mass of partially ground wheat and flour and impurities in relatively thin layers and moving and grading the same a number of times after each grinding and separating the flour therefrom and simultaneously forcing a slight draft of air throughout each layer during the entire process of moving and grading and separating for lifting and carrying away said impurities from the flour.

6. The herein-described process of removing impurities which are lighter in weight than flour from flour and partially ground wheat, which consists in repeated partial grindings of the wheat and moving and agitating the partially ground wheat and flour and impurities in masses of relatively thin layers, and separating the flour therefrom, simultaneously forcing a slight draft of air uniformly throughout each layer of moving material for lifting said impurities therefrom and carrying the same away during the process of agitating and grading and separating, and treating the completely reduced flour with the same draft of air after it is separated from the partially ground wheat.

7. The herein-described process of purifying flour during the manufacture thereof which consists in moving and agitating and grading the mass of mixed partially ground wheat and flour in relatively thin layers and separating the flour from the partially ground wheat, simultaneously forcing a slight draft of air uniformly throughout each layer of partially ground wheat and flour for lifting and carrying away impurities which are lighter in weight than flour, regrinding the graded wheat until all the wheat is reduced to flour and the impurities to a fine powder, and repeating the treatment with the air draft strong enough to lift and carry away the lighter and dark impurities therefrom between each grinding and treating the completely reduced and separated flour with the air draft.

8. The herein-described process of removing impurities from flour and partially ground wheat which consists in reducing the impurities to a fine powder which is lighter in weight than flour, moving masses of partly ground wheat and flour together with the lighter impurities in relatively thin layers and grading the partially ground wheat and separating the flour therefrom, and simultaneously forcing a slight draft of air uniformly throughout each moving layer of material for lifting and carrying away said impurities and leaving the flour, and repeating the entire process after each grinding until all of the wheat is converted into flour, and treating the completed and separated flour with the same draft of air.

9. The herein-described process of removing impurities from partially ground wheat and flour during the manufacture of the flour which consists in reducing the impurities to a fine powder which is lighter in weight than flour, moving the partially ground wheat and flour in masses of relatively thin layers, agitating and grading the partially ground wheat and separating the flour therefrom, repeating the process of agitating and grading and separating a number of times after each grinding of the wheat and forcing a slight draft of air uniformly throughout each layer of moving material while being agitated and graded and separated, and treating the completely reduced flour after it is separated from the wheat with the same draft of air.

In testimony whereof, I set my hand in the presence of two witnesses, this 15th day of May, 1912.

GEORGE THOMAS SMITH.

Witnesses:
A. L. JACKSON,
J. W. STITT.